United States Patent [19]
Chestnov et al.

[11] 3,976,461
[45] Aug. 24, 1976

[54] METHOD OF AND APPARATUS FOR ASSEMBLING ELECTRIC LAMP PRONGS WITHIN A GLASS ENVELOPE

[76] Inventors: Valery Fedorovich Chestnov, ulitsa Vasenko, 15, kv. 18; Dmitry Petrovich Ivankin, ulitsa Veselovskogo, 30, kv. 32, both of, Saransk, U.S.S.R.

[22] Filed: July 28, 1975

[21] Appl. No.: 599,945

[52] U.S. Cl. .................................. 65/59 A; 65/140; 65/139
[51] Int. Cl.[2] .......................................... C03B 23/14
[58] Field of Search ..................... 65/139, 140, 59 A

[56] References Cited

UNITED STATES PATENTS

| | | | |
|---|---|---|---|
| 1,907,532 | 5/1933 | Flaws, Jr. | 65/139 X |
| 2,296,347 | 9/1942 | Hinkley et al. | 65/140 |
| 2,637,144 | 5/1953 | Gardner et al. | 65/139 |

*Primary Examiner*—Arthur D. Kellogg
*Attorney, Agent, or Firm*—Haseltine, Lake & Waters

[57] ABSTRACT

A method of assembling electric lamp prongs and an installation for realization thereof relate to the equipment for making electric vacuum devices, e.g., incandescent and fluorescent lamps.

According to this method the prong parts, i.e., flanges and exhaust tubes held in the clamps of a chain conveyor are heated before fitting them with electrodes. In the installation for the realization of said method the burners for heating the flanges and the exhaust tubes are installed in the order of prong assembly before the electrode-loading device, the actuating mechanisms of the electrode-loading device, the prong-stamping mechanism and the exhaust tube hole-blowing mechanism being located on one of the conveyor sprockets. This rules out the burning up of electrodes during heating of the prong parts, reduces considerably the time required for heating the parts, steps up the output and simplifies the design of the installation.

7 Claims, 3 Drawing Figures

METHOD OF AND APPARATUS FOR ASSEMBLING ELECTRIC LAMP PRONGS WITHIN A GLASS ENVELOPE

The present invention relates to equipment for making electric vacuum devices and more specifically it relates to a method of assembling the prongs of electric lamps, e.g., incandescent and fluorescent ones and to installations for the realization of this method.

At present there exist installations for assembling the electric lamp prongs. Each such installation consists of intermittently-rotating turntables provided with clamps for receiving, holding and conveying the prong parts, i.e., flanges, exhaust tubes and electrodes, and actuating mechanisms installed on the immovable parts of said installation and powered by a cam-and-lever drive.

However, the efficiency of these installations is very low because the turntables rotate slowly due to heavy inertia loads arising at the beginning and end of turntable turning to one working position.

Also known at present are installations for assembling electric lamp prongs which comprise a continuously moving chain conveyor with driving and driven sprockets and clamps for receiving, holding and conveying the prong parts.

This installation is likewise provided with devices for loading the chain conveyor clamps with said flanges, exhaust tubes and electrodes, said devices being provided with actuating mechanisms; burners for heating the prong parts; mechanisms for stamping the prongs and blowing through the holes in the exhaust tubes; burners for annealing the prongs; and a device for unloading the assembled prongs. In these installations the burners for heating the prong parts are installed along the prong assembly line after the device for loading the electrodes into the exhaust tubes.

The prongs are assembled on this installation as follows: the chain conveyor clamps are loaded with flanges, exhaust tubes and electrodes in the prong assembly sequence, then they are heated, stamped and simultaneously the holes in the exhaust tubes are blown through. Then, if necessary, the parts are heated again, again stamped and annealed after which the assembled prongs are unloaded and directed for further treatment.

In view of the fact that the burners for heating the prong parts are installed after the device for loading the electrodes into the exhaust tubes, the flame of these burners is kept low to avoid the danger of melting the electrodes. Therefore, heating of glass from which the prong parts are made takes much time. This, in turn, increases the number of working positions on the installation and the dimensions of the latter. Besides, the devices for loading electrodes into the exhaust tubes and the mechanisms for stamping the prongs and blowing-through holes in the exhaust tubes are made in the form of transporters moving alongside of the chain conveyor. This results not only in the increase of the number of the working positions and in the increased size of the installation but also complicates its design.

The main object of the invention is to provide a method of assembling the electric lamp prongs and an installation for the realization of said method which would allow decreasing considerably the dimensions of the installation at the same time stepping up its output and eliminating the risk of burning the electrodes.

In accordance with these and other objects we provide a method of assembling the electric lamp prongs consisting in that the prong parts, i.e., flanges, exhaust tubes and electrodes, are placed successively in the clamps of a chain conveyor running around the driving and driven sprockets after which the prong parts are heated, stamped with simultaneous blowing through of holes in the exhaust tubes, and annealed, wherein, according to the invention, the flanges and exhaust tubes located in the clamps of the chain conveyor are heated before fitting them with electrodes, insertion of the electrodes into the flanges and exhaust tubes as well as stamping of parts and blowing of exhaust tube holes being effected on one of said sprockets.

It is practicable that before placing the electrodes into the flanges and exhaust tubes, these parts should be heated close to the softening temperature of the exhaust tube and flange material.

Thus, heating of the prong parts before insertion of the electrodes makes it possible to speed up the heating of these parts by increasing the intensity of burner flame. This reduces the time required for heating the parts and improves the quality of the produced prongs because heating the prong parts before fitting them with electrodes rules out completely the danger of melting the electrodes with the burner flame. Beside, it becomes possible to load the electrodes, stamp the parts and blow through the holes in the exhaust tubes on one of the conveyor sprockets which shortens considerably the time of assembly and simplifies the design of the installation for the realization of this method.

In the installation for assembling the electric lamp prongs comprising a continuously moving chain conveyor with driving and driven sprockets and with clamps for receiving, holding and conveying the prong parts, i.e., flanges, exhaust tubes and electrodes; devices for loading the chain conveyor clamps with flanges, exhaust tubes and electrodes, provided with actuating mechanism; burners for heating the prong parts; mechanisms for stamping the prong parts and blowing through the holes in the exhaust tubes; burners for annealing the prongs; and a device for unloading the assembled prongs, according to the invention, the burners for heating the flanges and exhaust tubes located in the clamps of the chain conveyor are installed in the prong assembly line before the device for loading the electrodes into the flanges and exhaust tubes while the actuating mechanisms of the device for loading electrodes and the mechanisms for stamping the prong parts and blowing through the holes in the exhaust tubes are located on one of the conveyor strockets.

This has made it possible to diminish and simplify considerably the kinematic layout of the installation by cancelling the drives of the device for loading electrodes and of the mechanisms for stamping the prongs and blowing through the holes in the exhaust tubes.

Besides, such a layout of the installation raises the labour efficiency considerably by curtailing the time for heating the prong parts, and reduces the dimensions of the installation.

In accordance with the present invention the sprocket carrying the actuating mechanisms of the device for loading electrodes and the mechanisms for stamping the prongs and blowing the holes is mounted on an immovable vertical axle secured in the upper and lower plates and carrying a disc on which are mounted the mechanisms for stamping the prongs and blowing the holes and the actuating mechanisms of the electrode loading device. This allows the movement of all the actuating mechanisms to be synchronized with the movement of the chain conveyor.

Another characteristic feature of the invention lies in that the lower plate is mounted with master forms which are in constant contact with the actuating mechanisms of the electrode-loading device and with the mechanisms for stamping the prong parts and blowing the holes; in this way said mechanisms are set in operation during rotation of the sprockets. This simplifies the kinematic layout of the installation and its operation and promotes the reliability of the actuating mechanisms.

Besides, the invention is characterized in that the electrode loading device provided with actuating mechanisms in the form of funnels moving in a vertical plane has swivelling gates installed, each, under the funnel and connected with it by a spring; the upper plate is provided with a stop interacting with the gates during rotation of the sprocket for periodic turning of said gates and withdrawing them from under the funnels when the electrodes are loaded from said funnels into the flanges and exhaust tubes. The design of such an electrode loading device is simpler than that of the known devices and ensures reliable functioning.

The invention is also characterized in that the mechanism for blowing the holes in the exhaust tubes is made in the form of a slide valve consisting of two parts located one above the other; the upper part of the slide valve is connected with the sprocket and has many holes each of which communicates with a pipe leading to the actuating mechanism for stamping the prong parts while the lower part is secured on the lower plate and has a hole which is in constant communication with a compressed air system and is periodically connected during rotation of the sprocket with one of the holes in the upper part.

Such a design of the mechanism for blowing holes in the exhaust tubes simplifies the installation and increases its reliability.

Thus, in the installation for assembling the electric lamp prongs according to the invention it takes less time for heating the prong parts, there is no danger of burning up the electrodes in the process of heating, the kinematic layout is simpler, the output is raised and the dimensions of the installations are reduced.

Now the invention will be described in detail by way of example with reference to the accompanying drawings in which.

The method of assembling the electric lamp prongs consists in loading the prong parts, i.e., flanges and exhaust tubes in succession into the clamps of a chain conveyor. Then the flanges and exhaust tubes are heated close to the softening point of their material (glass). Now the electrodes are loaded in and the prong parts are stamped with simultaneous blowing of holes in the exhaust tubes, and annealing.

Figure 1:
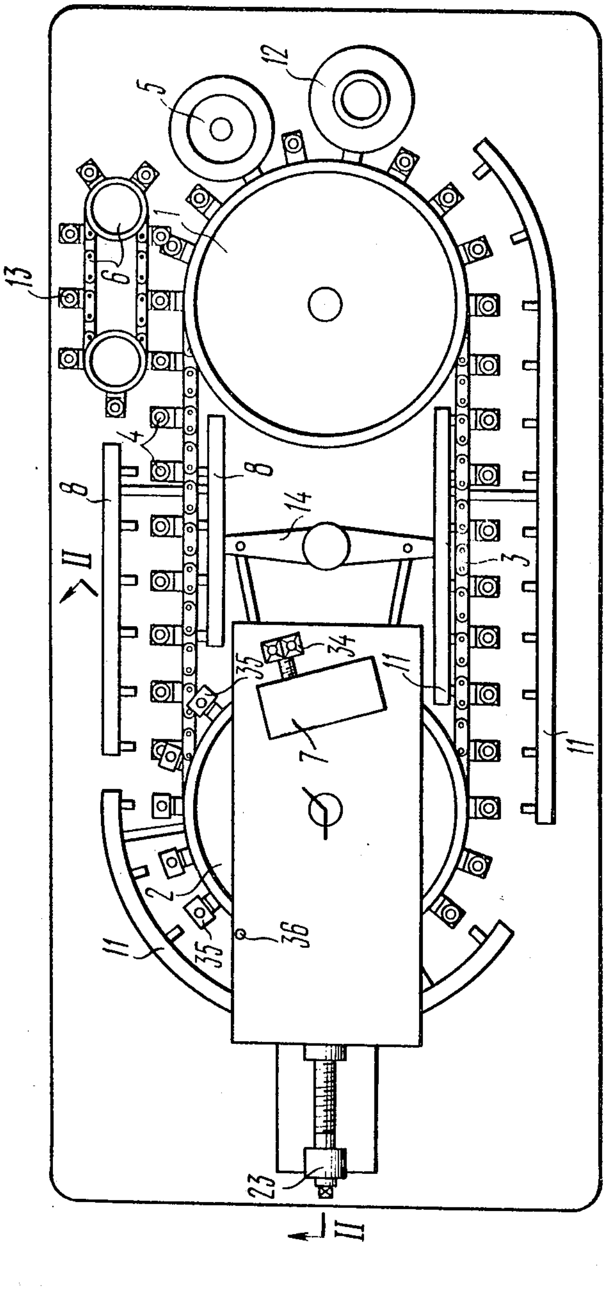
FIG. 1 is an elementary diagram of the installation for assembling the electric lamp prongs according to the invention, top view.

The installation for assembling the electric lamp prongs comprises the following known mechanisms and devices: a driving sprocket 1 (FIG. 1) and a driven sprocket 2; a chain conveyor 3 running around the sprockets 1 and 2 and carrying clamps 4 for receiving, holding and conveying the prong parts, i.e., flanges, exhaust tubes and electrodes; a device 5 for loading flanges into the conveyor clamps 4; a device 6 for loading the exhaust tubes into the conveyor clamps 4; a device 7 for loading the electrodes into the flanges and exhaust tubes located in the conveyor clamps 4; burners 8 for heating the prong parts; mechanisms 9 (FIG. 2) for stamping the prongs; mechanisms 10 for blowing through holes in the exhaust tubes; burners 11 (FIG. 1) for annealing the prongs; a device 12 for unloading the assembled prongs.

The flange-loading device 5 and the device 12 for unloading the assembled prongs is made in the form of known turntables with actuating mechanisms.

The exhaust tube loading device 6 is made in the form of a conveyor with clamps 13 installed at a pitch which is equal to the spaces between the clamps 4 of the conveyor 3.

The burners 8 and 11 of a known design are connected with a mechanism 14 which reciprocates these burners for accompanying the conveyor clamps 4.

According to the present invention, the burners are installed along the conveyor 3 before the device 7 for loading the electrodes into the flanges whereas the actuating mechanisms of the electrode loading device 7, the prong stamping mechanisms 9 and the mechanisms 10 for blowing holes in the exhaust tubes are mounted on the driven sprocket 2 in the sequence of prong assembly.

The burners 11 are installed along the conveyor 3 throughout its length from the burners 8 to the device 12 and are intended to heat the prong parts in order to soften their material for stamping the prongs and to relieve the stresses in the glass (annealing the prongs) after stamping.

The driven sprocket 2 (FIG. 2) is secured on projections 15 of a hollow pipe 16 installed on a vertical immovable axle 17 and resting on a bearing 18; bearings 19 located between the axle 17 and pipe 16 provide for free rotation of the sprocket 2 together with the pipe 16. The axle 17 is secured in the upper plate 20 and lower plate 21 interconnected by an upright 22. The upright 22 is connected with a tensioning mechanism 23. The lower plate 21 is located in the guides 24 of a frame 25 which allows the chain of the conveyor 3 to be tensioned when the plates 20, 21 together with the sprocket 2 are moved by the tensioning mechanism 23 over the guides 24 of the frame 25.

The axle 17 has a disc 26 secured on the projection 27 of the hollow pipe 16. The disc 26 carries the stamping mechanism 9 and the mechanism 10 for blowing holes in the exhaust tubes.

The prong stamping mechanism 9 comprises stamping jaws 28, gears 29 for turning the stamping jaws 28, a pushrod 30 with a rack 31, installed vertically and provided at the end with a roller 32 which is in constant contact with a master form 33 secured on the lower plate 21. The rack 31 is in constant engagement with one of the gears 29 which also mesh with each other.

In addition to the funnels 34 and the actuating mechanism in the form of vertically-moving funnels 35, the electrode loading device 7 (FIG. 1) is provided with swivelling gates 36. Each gate 36 (FIG. 2) is installed under the funnel 35 being connected with it by a spring 37 and is mounted on a bracket 38 secured on a vertical upright 39 passing through a hole in the disc 26. The upright 39 has a roller 40 at the end which is in constant contact with a master form 41 located on the lower plate 21 so that the upright 39 together with the funnel 35 and gate 36 can move vertically by following the profile of the master form 41 during rotation of the sprocket 2.

The side of the upper plate 20 facing the sprocket 2 has a stop 42 in the form of a bar. Said stop 42 interacts with the extensions of the gates 36 during rotation of the sprocket 2 with the purpose of turning said gates periodically and withdrawing them from under the funnel 35 while the electrodes are loaded into the prong flanges held in the clamps 4 of the conveyor 3. After loading the electrodes, the gate 36 is returned to the initial position by the spring 37.

Figure 2:
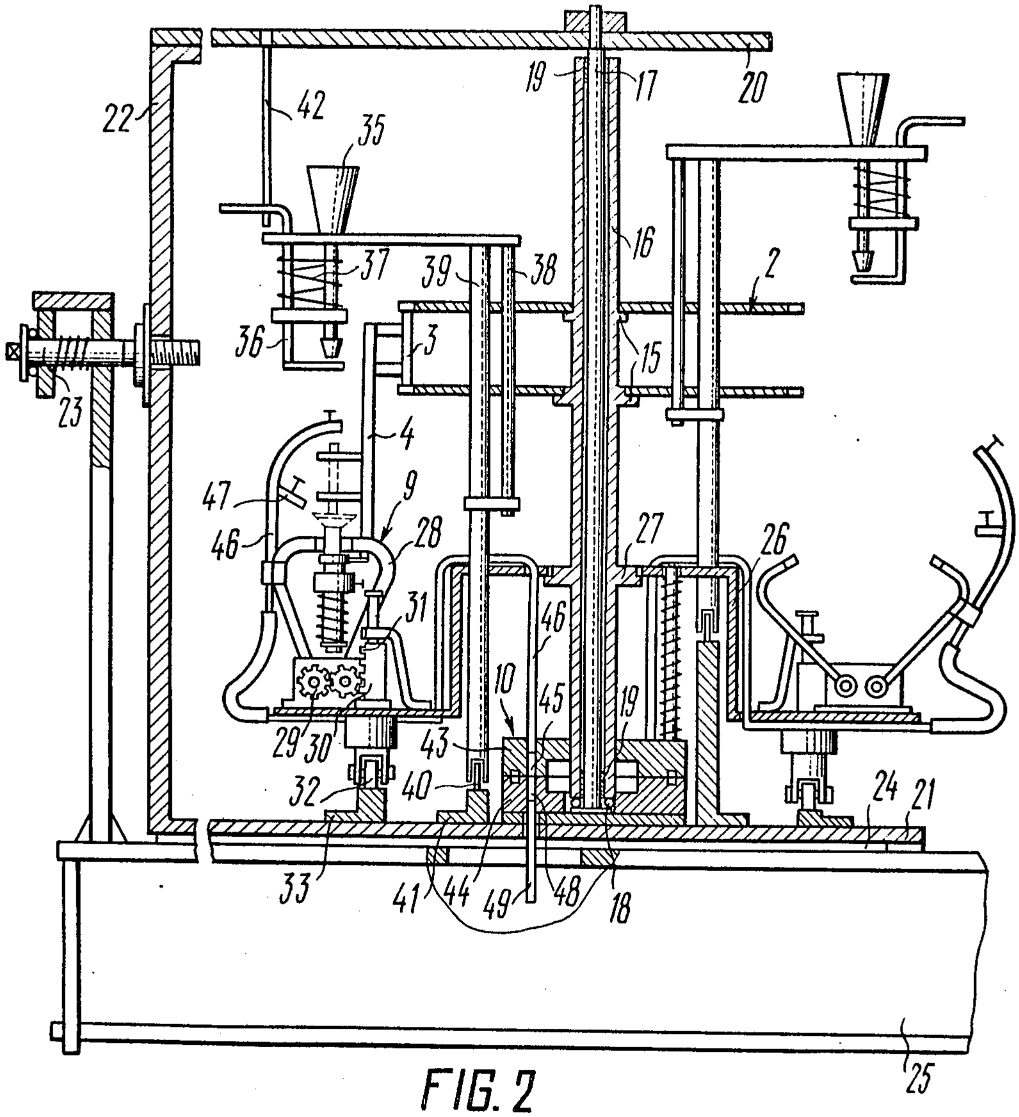
FIG. 2 is a section taken along line II—II in FIG. 1.

The mechanism 10 for blowing holes in the exhaust tubes has the form of a slide valve consisting of two parts 43 and 44 arranged one above the other. The upper part 43 has a multitude of holes 45 located at the same distance from the axle 17 and communicates with the sprocket 2 through the hollow pipe 16 on which said upper part is secured. The number of holes 45 is equal to the number of prong stamping mechanisms 9 and each of these holes communicates with a pipe 46 secured on the disc 26. The free end of this pipe is brought to the stamping jaws 28, is secured to one of them as shown in FIG. 2 and has a nozzle 47 located level with the clamps 4 of the conveyor 3.

The lower part 44 of the slide valve is secured on the lower plate 21 and has a hole 48 which is in constant communication with the compressed air system through a pipe connection 49. During rotation of the sprocket 2 and of the upper part 43 of the slide valve the hole 48 is periodically aligned with one of the holes 45 in the upper part 43 of the slide valve.

Figure 3:
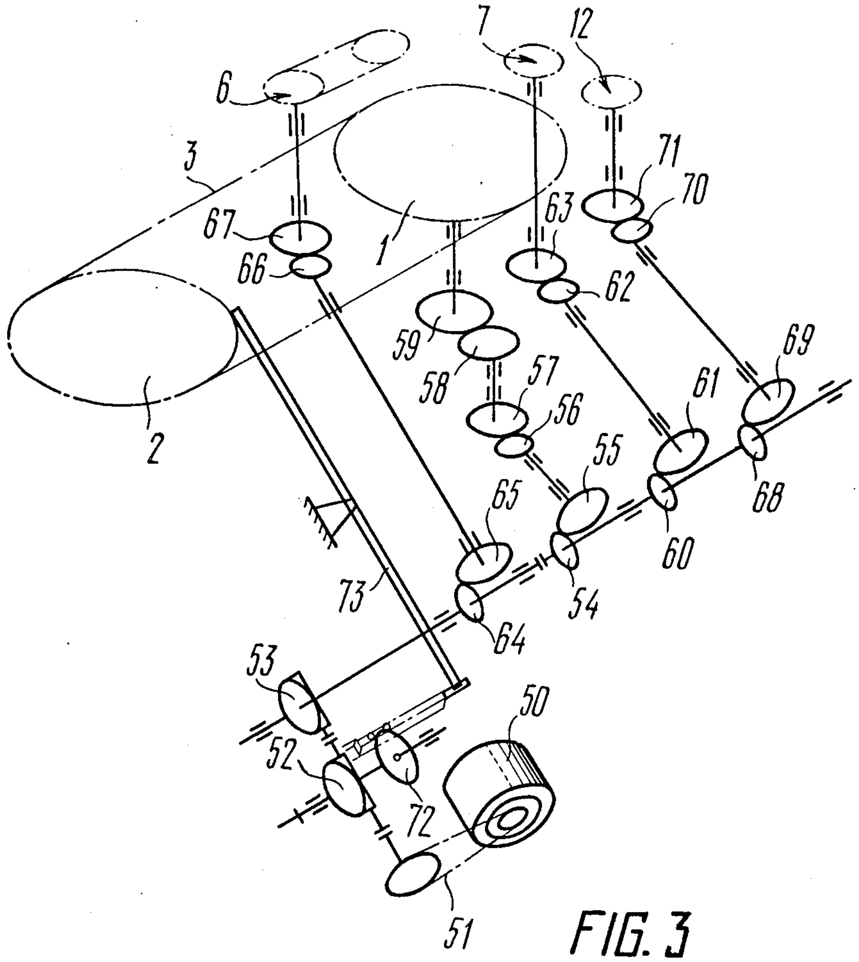
FIG. 3 shows the kinematic layout of the installation.

The driving sprocket 1 and driven sprocket 2 of the conveyor 3 are moved continuously by an electric motor 50 (FIG. 3) via a V-belt transmission 51, speed reducers 52 and 53, bevel gears 54, 55, 56, 57 and spur gears 58 and 59.

The flange-loading device 7 is driven by the electric motor 50 via the V-belt transmission 51, speed reducers 52 and 53 and bevel gears 60, 61, 62, 63. The device 6 for loading exhaust tubes is powered by the electric motor 50 via the V-belt transmission 51, speed reducers 52 and 53 and bevel gears 64, 65, 66, 67. The prong-unloading device 12 is powered by the electric motor 50 via the V-belt transmission 51, speed reducers 52 and 53 and bevel gears 68, 69, 70 and 71. The mechanism 14 which reciprocates the burners 8 and 11 is driven by the electric motor 50 via the V-belt transmission 51, speed reducer 52, slotted cam 72 and lever 73.

The installation operates as follows. The electric motor 50 is switched on and sets in motion the driving sprocket 1 and, consequently, the conveyor 3 via the V-belt transmission 51, speed reducers 52 and 53, bevel gears 54, 55, 56, 57 and spur gears 58 and 59; it also sets in motion the flange-loading device via the bevel gears 60, 61, 62, 63; the exhaust tube-loading device via the bevel gears 64, 65, 66, 67; the prong-unloading device via the bevel gears 68, 69, 70, 71; and the mechanism 14 via the slotted cam 58 and lever 59. While the conveyor 3 (FIG. 1) moves through the zone of the device 5, its clamps are loaded with flanges in the known manner. During further movement of the conveyor 3 its clamps 4 enter the zone of the device 6 and when the clamps 13 of the device 6 get in alignment with the clamps 4 of the conveyor 3, the exhaust tubes are transferred from the clamps 13 into the clamps 4. As the conveyor 3 moves further, the clamps 4 enter the zone of the burners 8 where the flanges and exhaust tubes are softened by heating and the mechanism 14 reciprocates the burners 8 along the conveyor accompanying the clamps 4 which ensures the best heating conditions of the prong parts.

As the conveyor 3 moves still further, its clamps 4 carrying the flanges and exhaust tubes approach the driven sprocket 2 (FIG. 3) and said clamps 4 are loaded with electrodes through the funnels 34 and 35 of the device 7. When the funnels 35 are aligned with the conveyor clamps 4, said funnels 35 are lowered to the downmost position by the upright 39 contacting the master form 41. The gates 36 interact with the stop 42 and turn thus allowing the electrodes to be discharged from the funnels 35. The electrodes fall into the flanges and exhaust tubes located in the conveyor clamps 4 after which the gates 36 are disengaged from the stop 42 and are turned by the spring 37 to the initial position, shutting off the funnel 35. At the same time the burners 11 installed close to the driven sprocket heat the prong parts helt in the clamps 4. Then the pushrod 30 of the prong stamping mechanism 9 is moved by the master form 33 to the uppermost position. The rack 31 of the pushrod 30 starts rotating the gears 29 which are rigidly connected with the stamping jaws 28. The latter turn towards each other and stamp the heated parts of the lamp prong. Then, by following the profile of the master form 33, the stamping jaws 28 move apart somewhat and at this moment the hole 48 of the slide valve part 44 gets in line with the hole 45 in the upper part 43 of the slide valve and the pipes 46 are fed with compressed air; as a result, the hole in the prong exhaust tube is blown through. Then the stamping jaws 28 are forced together again and the prongs are stamped for the second time, if necessary, in the same manner as before. At this moment the funnels 35 are lifted by the master form 41 to the uppermost position for receiving the next batch of electrodes while the clamps of the conveyor 3 enter the zone of the burners 11 where the glass is annealed. During the further movement of the conveyor 3 (FIG. 1) its clamps enter the zone of the device 12 where the assembled prongs are unloaded in the known manner.

We claim:

1. A method of assembling electric lamp prongs consisting in that the prong flanges and exhaust tubes are put in succession into the clamps of a chain conveyor running around a driving sprocket and a driven sprocket; said flanges and exhaust tubes carried by the conveyor are heated; the heated flanges and exhaust tubes are fitted with electrodes after which the prong flanges and exhaust tubes with electrodes are stamped with simultaneous blowing through of holes in the exhaust tubes; then the prong parts are annealed; insertion of electrodes into the flanges and exhaust tubes, stamping of parts and blowing of holes are performed on one of said sprockets.

2. A method according to claim 1 wherein, before inserting the electrodes into the flanges and exhaust tubes, the prong parts are heated close to their softening point.

3. An installation for assembling electric lamp prongs comprising: a chain conveyor; driving and driven sprockets around which said chain conveyor runs; a drive connected with said driving sprocket for setting the conveyor in continuous motion; clamps secured to the chain conveyor and intended to receive, hold and convey the prong parts, i.e., flanges, exhaust tubes and electrodes; a device for loading the flanges into said conveyor clamps installed near said conveyor and provided with actuating mechanisms; a device for loading the exhaust tubes into the flanges located in the clamps of said conveyor, said device being installed along the conveyor in the order of prong assembly and provided with actuating mechanisms; burners for heating the flanges and exhaust tubes moved by said conveyor clamps; a device for loading electrodes into the heated flanges and exhaust tubes, provided with actuating mechanisms; mechanisms for stamping the prong parts; mechanisms for blowing through holes in the exhaust tubes; burners for annealing the prongs installed along said conveyor; a device for unloading the assembled prongs, installed near said conveyor; said burners for heating the flanges and exhaust tubes are installed along said conveyor before said device for loading electrodes to the zone of said burners for annealing the prongs; the actuating mechanisms of said electrode-loading device, the prong-stamping and exhaust tube hole-blowing mechanisms are located on one of said sprockets in the order of prong assembly.

4. An installation according to claim 3 wherein the sprocket carrying the actuating mechanisms of the electrode-loading device, the stamping and hole-blowing mechanisms is installed on an immovable vertical axle secured in the upper and lower plates, said axle being mounted with a disc which carries the prong-stamping and hole-blowing mechanisms.

5. An installation according to claim 4 wherein the lower plate mounts master forms which are in constant contact with the actuating mechanisms of the electrode-loading device and with the stamping and hole-blowing mechanisms for setting them in motion during rotation of the sprocket.

6. An installation according to claim 4 wherein the electrode-loading device with the actuating mechanisms in the form of vertically-moving funnels is provided with swivelling gates installed, each, under the funnel and connected with it by a spring, the upper plate being provided with a stop interacting with the gates during rotation of the sprocket for turning said gates periodically and withdrawing them from under the funnel while the electrodes are being loaded from the funnels into the flanges and exhaust tubes.

7. An installation according to claim 4 wherein the mechanism for blowing through holes in the exhaust tubes is made in the form of a slide valve consisting of two parts arranged one above the other, the upper part being connected with the sprocket and provided with holes communicating, each, with the pipe brought to the stamping mechanism while the lower part is secured on the lower plate and has a hole which communicates constantly with the compressed air system and periodically with one of the holes of the upper part during rotation of the sprocket.

* * * * *